US010671054B2

(12) United States Patent
Makino (10) Patent No.: US 10,671,054 B2
(45) Date of Patent: Jun. 2, 2020

(54) NUMERICAL CONTROL DEVICE FOR PERFORMING SMOOTH DECELERATION AND STOPPING (71) Applicant: FANUC Corporation, Minamitsuru-gun, Yamanashi (JP)

(72) Inventor: Iwao Makino, Minamitsuru-gun (JP)

(73) Assignee: FANUC CORPORATION, Minamitsuru-gun, Yamanashi (JP)

(*) Notice: Subject to any disclaimer, the term of this patent is extended or adjusted under 35 U.S.C. 154(b) by 343 days.

(21) Appl. No.: 14/918,635

(22) Filed: Oct. 21, 2015

(65) Prior Publication Data

US 2016/0116907 A1 Apr. 28, 2016

(30) Foreign Application Priority Data

Oct. 22, 2014 (JP) .................................. 2014-215472

(51) Int. Cl.
*G05B 19/416* (2006.01)

(52) U.S. Cl.
CPC .. *G05B 19/416* (2013.01); *G05B 2219/39098* (2013.01)

(58) Field of Classification Search
None
See application file for complete search history.

(56) References Cited

U.S. PATENT DOCUMENTS 5,311,110 A * 5/1994 Iwashita ............ G05B 13/0205
318/568.15
6,591,148 B1 * 7/2003 Masuda ................ G05B 19/184
409/274

2005/0209712 A1 * 9/2005 Sagasaki ............ G05B 19/4093
700/28
2007/0138989 A1 6/2007 Iwashita et al.
2008/0269915 A1 * 10/2008 Endo .................... G05B 19/416
700/13

(Continued)

FOREIGN PATENT DOCUMENTS

CN 1971457 A 5/2007
CN 102880118 A 1/2013

(Continued)

OTHER PUBLICATIONS

Decision to Grant a Patent dated Sep. 6, 2016 in Japanese Patent Application No. 2014-215472 (3 pages) with an English Translation (3 pages).

(Continued)

*Primary Examiner* — Rocio Del Mar Perez-Velez
*Assistant Examiner* — Hung H Dang
(74) *Attorney, Agent, or Firm* — Faegre Drinker Biddle & Reath LLP (57) ABSTRACT A numerical control device configured to perform stopping control of an axis of a machining tool to be controlled corresponding to command for machining interruption during machining by moving a workpiece or a tool using cycle operation, the numerical control device includes an override input unit, a decelerating and stopping override change unit configured to calculate actual override, decelerated in stages at each interpolation period based on the override acquired by the override input unit, and a velocity calculation unit configured to decelerating and stopping control of the axis.

2 Claims, 8 Drawing Sheets (56) References Cited

U.S. PATENT DOCUMENTS

| | | | | |
|---|---|---|---|---|
| 2014/0195037 A1* | 7/2014 | Nishibashi | ......... | G05B 19/4103 |
| | | | | 700/188 |
| 2014/0236340 A1* | 8/2014 | Terada | ................ | G05B 19/182 |
| | | | | 700/160 |
| 2014/0368151 A1 | 12/2014 | Makino | | |

FOREIGN PATENT DOCUMENTS

| | | | |
|---|---|---|---|
| CN | 103163838 A | 6/2013 |
| JP | 2000-347713 A | 12/2000 |
| JP | 2002-082705 A | 3/2002 |
| JP | 2007-172080 A | 7/2007 |
| JP | 2010-9094 A | 1/2010 |
| JP | 2014-241074 A | 12/2014 |

OTHER PUBLICATIONS

The Notification of the First Office Action dated Sep. 1, 2017 in Chinese Patent Application No. 2015106890355 (5 pages) with an English translation (7 pages).

Weck et al. "Werkzeugmaschinen 4—Automatisierung von Maschinen und Anlagen," 6. Auflage, 2006, pp. 213-217.

Office Action dated Jan. 31, 2019 in German Patent Application No. 10 2015 013 603.8 (5 pages) with an English translation (5 pages).

\* cited by examiner

ND CONTROL DEVICE FOR
PERFORMING SMOOTH DECELERATION
AND STOPPING

RELATED APPLICATION DATA

This application claims priority under 35 U.S.C. § 119 and/or § 365 to Japanese Application No. 2014-215472 filed Oct. 22, 2014, the entire contents is incorporated herein by reference.

BACKGROUND OF THE INVENTION

1. Field of the Invention

The present invention relates to a numerical control device, and more particularly to a numerical control device which smoothly changes feed rate when high-speed cycle machining is stopped.

2. Description of the Related Art

The present invention relates to a numerical control device, and more particularly to a numerical control device which smoothly changes feed rate when high-speed cycle machining is stopped.

In numerical control device (CNC), a high-speed cycle machining technique for performing cycle operation repeatedly. For performing high-speed cycle machining, machining configuration is converted into high-speed cycle machining data and stored in a variable region of the numerical control device, the high-speed cycle machining data is called by an NC program command, and movement amount of command data at each execution cycle is read out from the high-speed cycle machining data for performing the high-speed cycle machining.

Figure 8:
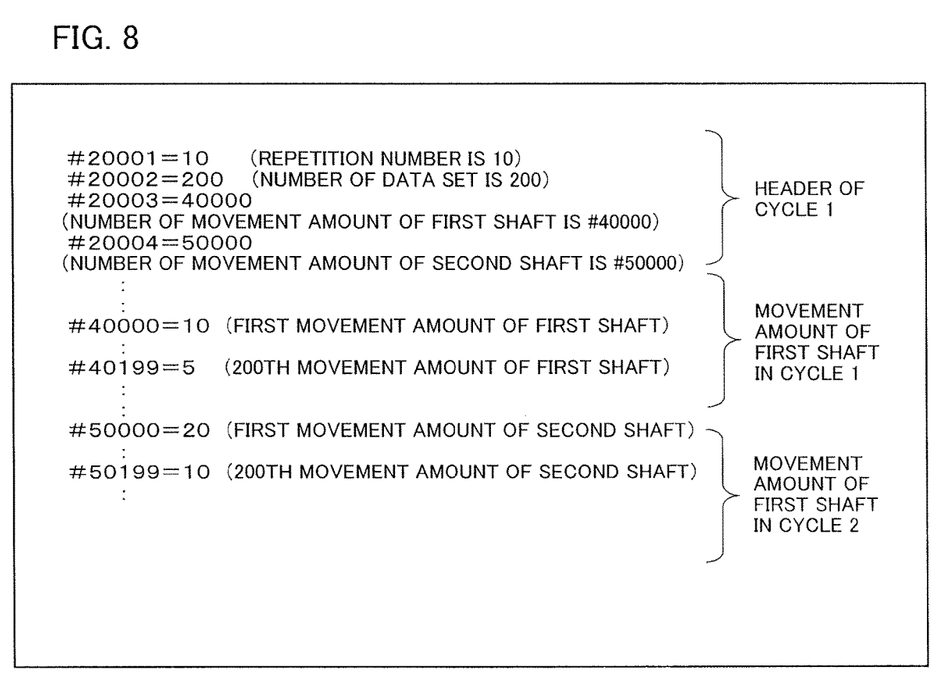
FIG. 8 is a schematic diagram illustrating an example of high-speed cycle machining data.

FIG. 8 is a diagram illustrating an example of high-speed cycle machining data in prior art. As shown in FIG. 8, the high-speed cycle machining data consist of header and movement amount, and in the header, repetition number of the cycle, data number of the movement amount, and start number of the movement amount are defined, and a number of the movement amounts corresponding to the number designated at the header are prepared for each axis.

Figure 9:
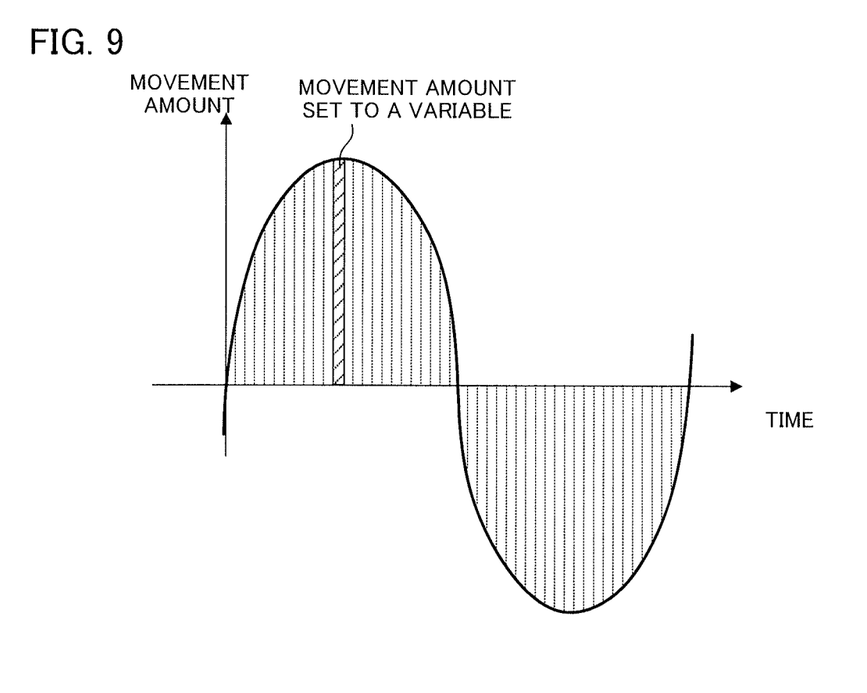
FIG. 9 is a graph of movement amount of control axis of machining tool and time in high-speed cycle machining.

FIG. 9 shows a relationship between the movement amount and cycle data for a cycle generated by aggregating a plurality of movement amounts, using a graph of movement amount of control axis of machining tool and time.

As a prior art related to the high-speed cycle machining above mentioned, a technique in which movement amount of the high-speed cycle machining repeating the same operation in cycle operation and NC program command are superimposed (for example, Japanese Patent Laid-Open No. 2010-009094).

Any one of resetting, feed holding, and interlocking is performed during the high-speed cycle machining, execution of the high-speed cycle machining is interrupted, and the drive axis stops immediately at the interruption of the execution since the high-speed cycle machining faithfully implements motion in the command and does not perform acceleration and deceleration by interpolation. Therefore, one of the two methods below is necessary for restraining mechanical shock of the machine or machining error.

Method 1: The high-speed cycle machining data for decelerating and stopping is prepared, the machine set to be state of resetting, feed holding, or interlocking after decelerating and stopping by execution of the cycle.

Method 2: The machine set to be state of resetting, feed holding, or interlocking after decelerating and stopping while the override is decreased little by little using ladder program.

Figure 10:
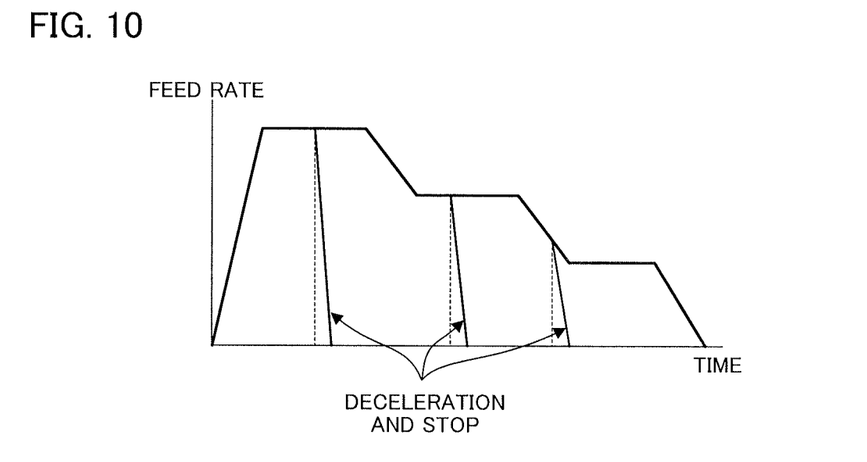
FIG. 10 is a diagram illustrating decelerating and stopping control using high-seed cycle machining data for decelerating and stopping in prior art.

FIG. 10 shows a graph of velocity and time when the high-speed cycle machining data for decelerating and stopping according to Method 1.

The override in Method 2 is function to change feed rate based on the designated magnification of the commanded feed rate by input signal. Actual override for obtaining actual feed rate is calculated by multiplying the commanded feed rate by the designated override by the input signal, and calculates the feed rate by multiplying the commanded feed rate by the actual override. Period for change the actual override by the override is input period of the signal (for example, 4 msec) and is longer than the interpolation period (for example, 1 msec).

It is necessary to prepare a large amount of high-speed cycle machining data for decelerating and stopping from the feed rate at each machining or at acceleration or deceleration, in addition to decelerate and stop while keeping synchronization between each axis when the high-speed cycle machining data for decelerating and accelerating by Method 1 is executed. Therefore, there has been a problem that data size for the high-speed cycle machining data increases and work load for generation of the high-speed cycle machining data increases.

When the ladder program decreases the override little by little in Method 2, capacity for the high-speed cycle machining data is decreased since the high-speed cycle machining data for decelerating and stopping is not necessary, and the work load for generation of the high-speed cycle machining data is decreased. However, since the period for change the actual override by the override is the input period of the signal (for example, 4 msec) and is longer than the interpolation period (for example, 1 msec), there is a program that time and distance necessary for deceleration become long, or change amount for one override become large, and the work load for generating ladder program increases.

Figure 11A:
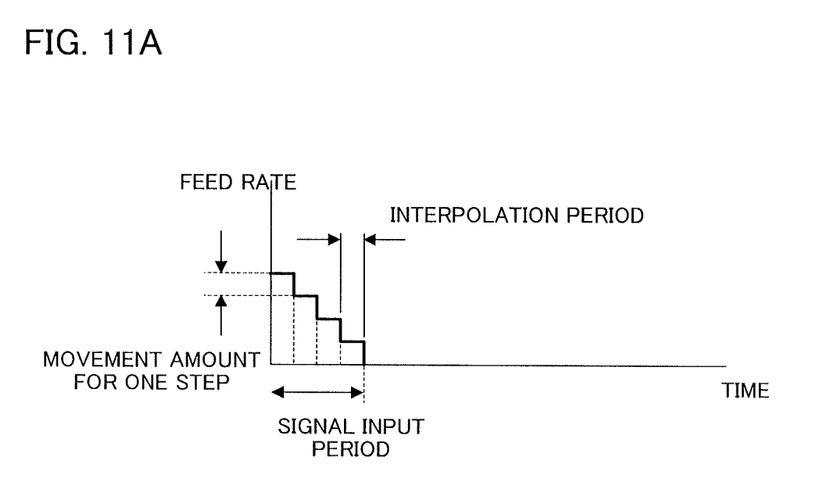
FIGS. 11A and 11B is a diagram illustrating decelerating and stopping control using override in prior art.
Figure 11B:
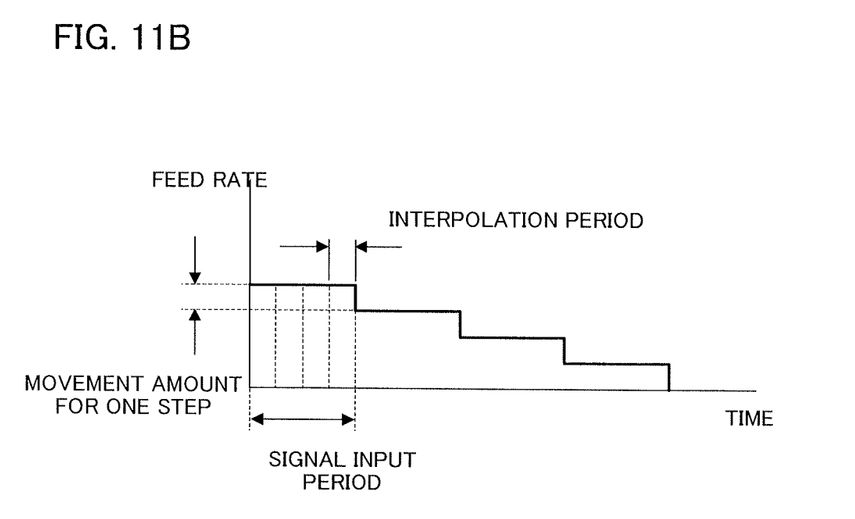

FIGS. 11A and 11B shows examples in which the high-speed cycle machining data for decelerating and stopping is executed and in which the override is changed, while the feed rate is changed for the same amount at each step in both examples.

For a gear grinder and a crank pin grinder, there has been a problem that long time is necessary for restarting operation since recovery to start position while a grindstone and a workpiece is synchronized for preventing interference is required when the high-speed cycle machining is interrupted in the cycle operation.

SUMMARY OF THE INVENTION

In view of the above-described problems in the prior art techniques, a purpose of the present invention is to provide a numerical control device capable of smoothly decelerating and stopping at predetermined position in cycle operation within a short time, without increasing the work load for generating ladder program or the capacity of the high-speed cycle machining data for decelerating and stopping in the high-speed cycle machining.

The numerical control device according to the present invention is configured to perform stopping control of an axis of a machining tool to be controlled corresponding to command for machining interruption during machining by moving a workpiece or a tool using cycle operation for repeatedly performing same motion, the numerical control device, including an override input unit configured to acquire override, a decelerating and stopping override change unit configured to calculate actual override, decelerated in stages at each interpolation period based on the override acquired by the override input unit, and a velocity calculation unit configured to decelerating and stopping control of the axis based on the actual override.

The decelerating and stopping override change unit is may calculate the actual override such that the axis decelerates to stop at a predetermined position of the cycle operation.

The present invention, with the above configuration, when any one of resetting, feed holding, and interlocking is performed during the high-speed cycle machining is performed, the work load for generating the high-speed cycle machining data for decelerating and stopping and for generating the ladder program for decreasing the override little by little is not required, and the machine is smoothly decelerated and stopped in a short time without increasing the data amount of the high-speed cycle machining data. In addition to that, time required for restarting operation after the decelerating and stopping is decreased by stopping at the predetermined position in the cycle operation if necessary.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Decelerating and stopping function in high-speed cycle machining according to an embodiment of the present invention will be outlined first.

Figure 1:
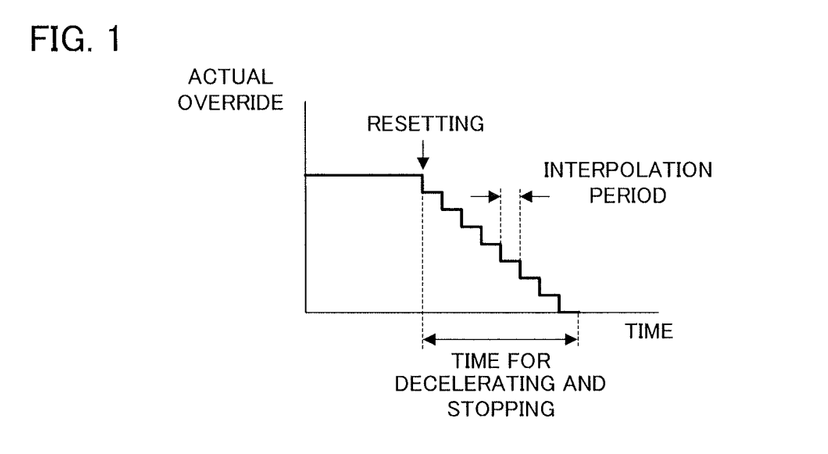
FIG. 1 is a schematic diagram of decelerating and stopping in the high-speed cycle machining according to an embodiment of the present invention.
Figure 2:
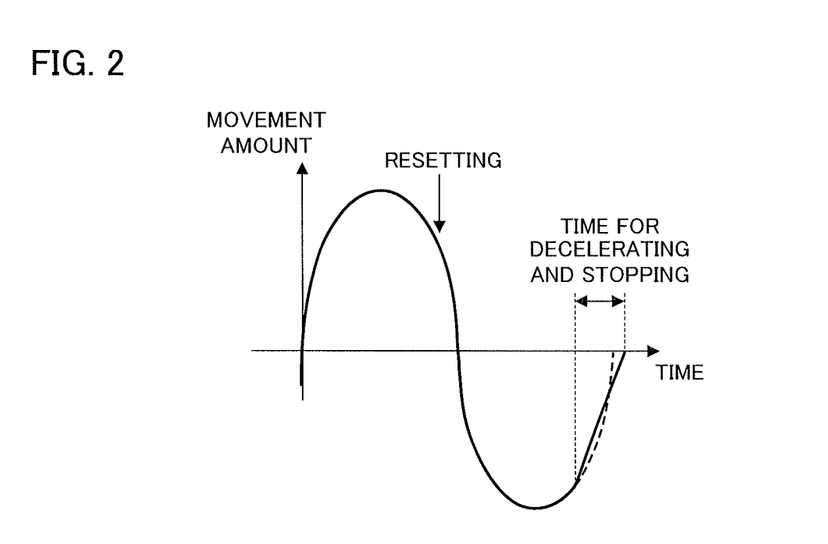
FIG. 2 is a graph of movement amount and time when the machine stops at the last movement amount data according to an embodiment of the present invention.

The numerical control device with the decelerating and stopping function in high-speed cycle machining in the present embodiment changes actual override stepwisely at each interpolation period such that the actual override to be 0% in predetermined deceleration time, when any one of resetting, feed holding, and interlocking is performed during the high-speed cycle machining. The machine is smoothly stopped in a short time by changing the actual override not at the signal input period but at the interpolation period. In addition to that, the numerical control device with the decelerating and stopping function in high-speed cycle machining in the present embodiment, when any one of resetting, feed holding, and interlocking is performed during the high-speed cycle machining, does not decelerate and stop immediately, but performs decelerating and stopping such that the machine stops at the predetermined position in cycle operation if necessary. FIG. 2 is a graph of movement amount and time when the machine stops at the last movement amount data in the numerical control device with the decelerating and stopping function in high-speed cycle machining in the present embodiment.

Figure 3:
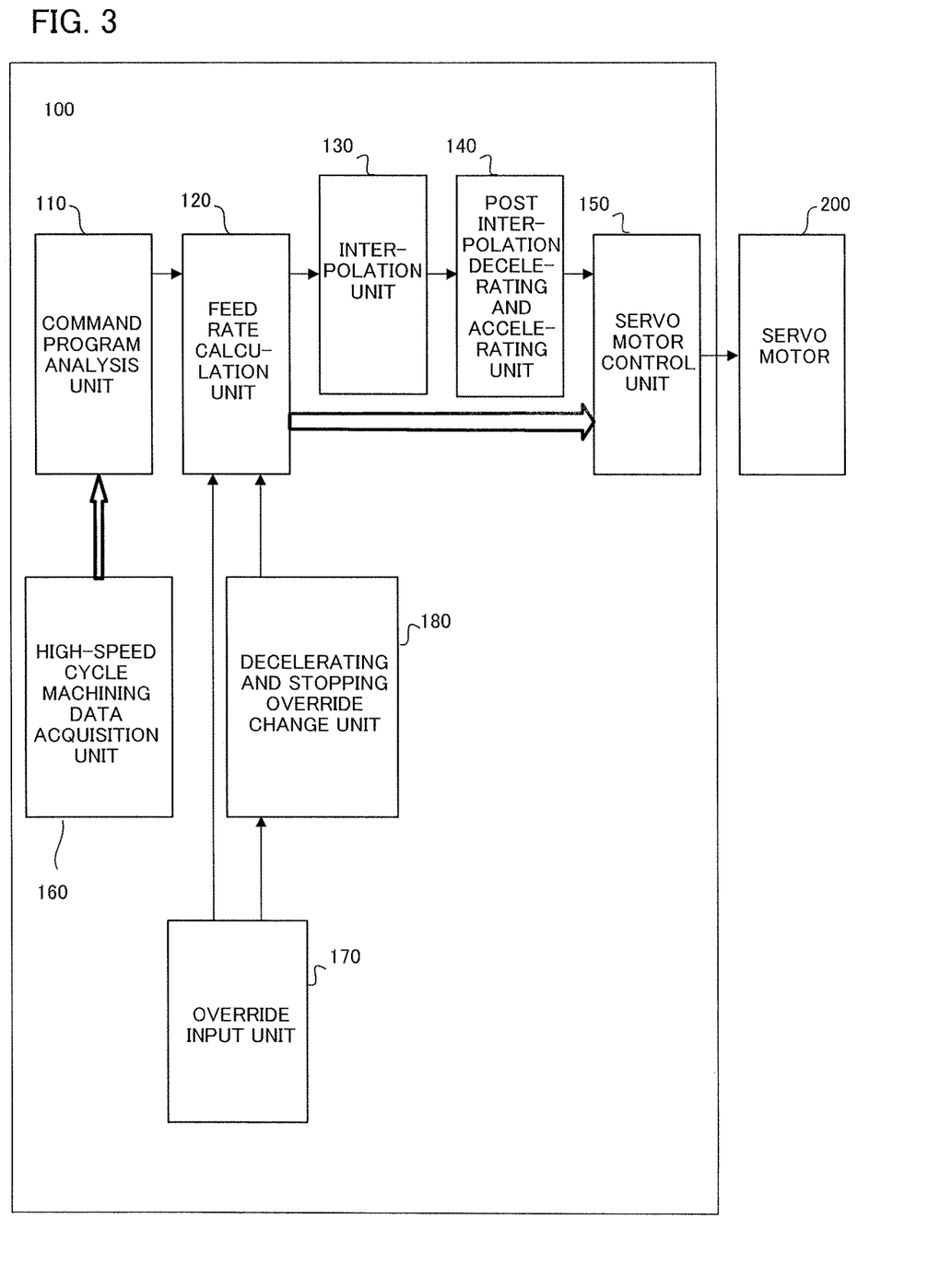
FIG. 3 is a schematic block diagram of a numerical control device according to an embodiment of the present invention.

FIG. 3 is a schematic block diagram of a numerical control device according to an embodiment of the present invention. The numerical control device 100 includes a command program analysis unit 110, a feed rate calculation unit 120, an interpolation unit 130, a post interpolation decelerating and accelerating unit 140, a servo motor control unit 150, a high-speed cycle machining data acquisition unit 160, an override input unit 170, a decelerating and stopping override change unit 180.

The numerical control device 100, for machining based on NC program command, analyzes the NC program by the command program analysis unit 110, calculates the feed rate at each interpolation period by the feed rate calculation unit 120, performs interpolation by the interpolation unit 130 based on the feed rate, performs acceleration and deceleration by the post interpolation decelerating and accelerating unit 140, drives a servo motor 200 through the servo motor control unit 150, and relatively moves the workpiece and the tool.

The numerical control device 100, for high-speed cycle machining, acquires the high-speed cycle machining data from the high-speed cycle machining data acquisition unit 160 by the command program analysis unit 110 as shown in a void arrow in FIG. 3, multiplies the high-speed cycle machining data by the feed rate calculated by the feed rate calculation unit 120, outputs the result to the servo motor control unit 150 which drives and controls the servo motor 200 directly and not through the interpolation unit 130 or the post interpolation decelerating and accelerating unit 140, and relatively moves the workpiece and the tool.

In the conventional calculation of the feed rate, the command rate is acquired by the command program analysis unit 110, the override is acquired by the override input unit 170, the override is set to the actual override at signal input period by the feed rate calculation unit 120, and multiples the command rate and the actual override to calculate the feed rate.

In contrast, in the calculation of the feed rate in the present embodiment, the command rate is acquired by the command program analysis unit 110, the override is acquired by the override input unit 170, current override is changed to 0% stepwisely in the predetermined time by the decelerating and stopping override change unit 180 in case of any one of resetting, feed holding, and interlocking, the actual override of the decelerating and stopping override change unit 180 is acquired at each interpolation period by the feed rate calculation unit 120, and multiples the command rate and the actual override at interpolation period to calculate the feed rate. The decelerating and stopping override change unit 180 in the present embodiment belongs to the feed rate calculation unit 120.

Feed rate control when any one of resetting, feed holding, and interlocking is performed during the high-speed cycle machining, in the numerical control device 100 in the present embodiment with the above configuration, will be described below.

Figure 4A:
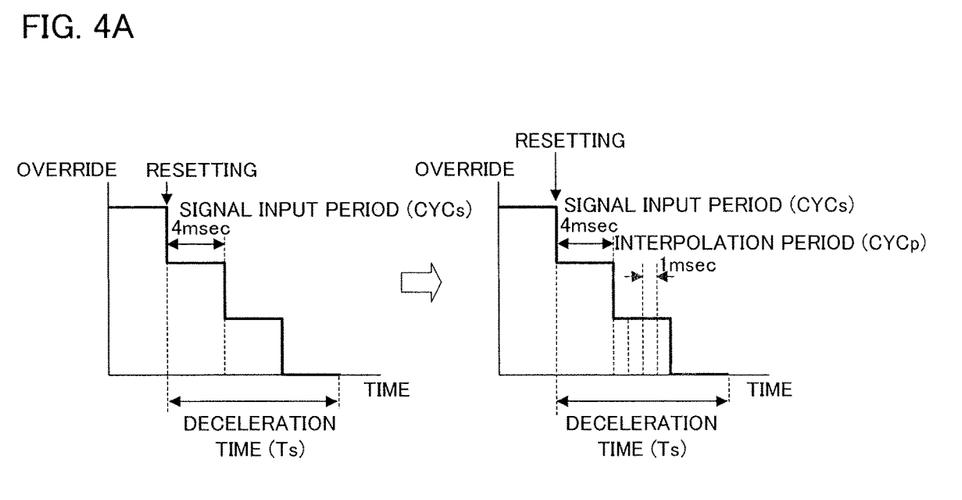
FIGS. 4A, 4B are diagrams illustrating a difference of feed rate control at decelerating and stopping in high-speed cycle machining in embodiment of the present invention and in a prior art.
Figure 4B:
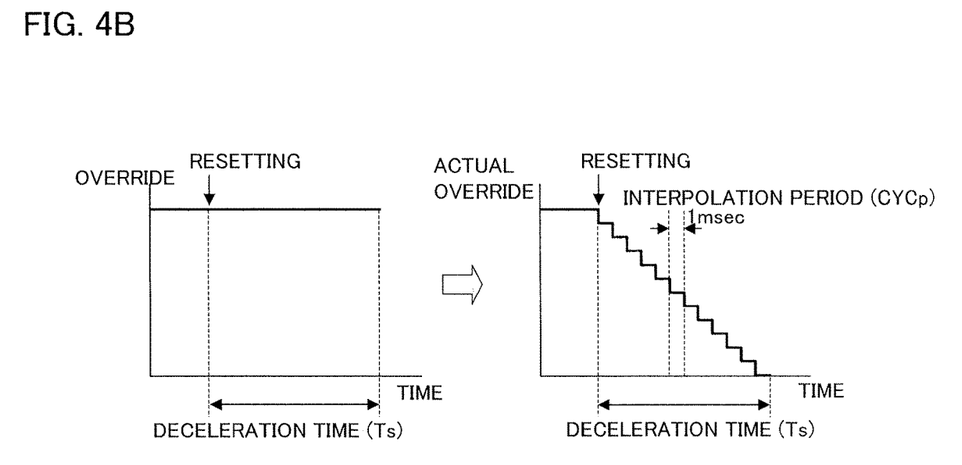

FIGS. 4A, 4B are graphs illustrating time change of the override (input override value) divided by the actual override (override value to be used in the actual feed rate control), in the numerical control device in the prior art and the present embodiment, when the signal input period (CYCs) is 4 msec and the interpolation period (CYCp) is 1 msec.

As shown in FIG. 4A, when the ladder program in the prior art decreases the override little by little, the accrual override changes at the signal input period (CYCs), so the override set in the ladder program is used as the actual override.

In contrast, in the numerical control device in the present embodiment, since the decelerating and stopping override change unit 180 calculates the actual override at interpolation cycle and the actual override (OVRp) finely changes, the machine moves more smoothly and decelerates and stops compared to the prior art.

Figure 5:
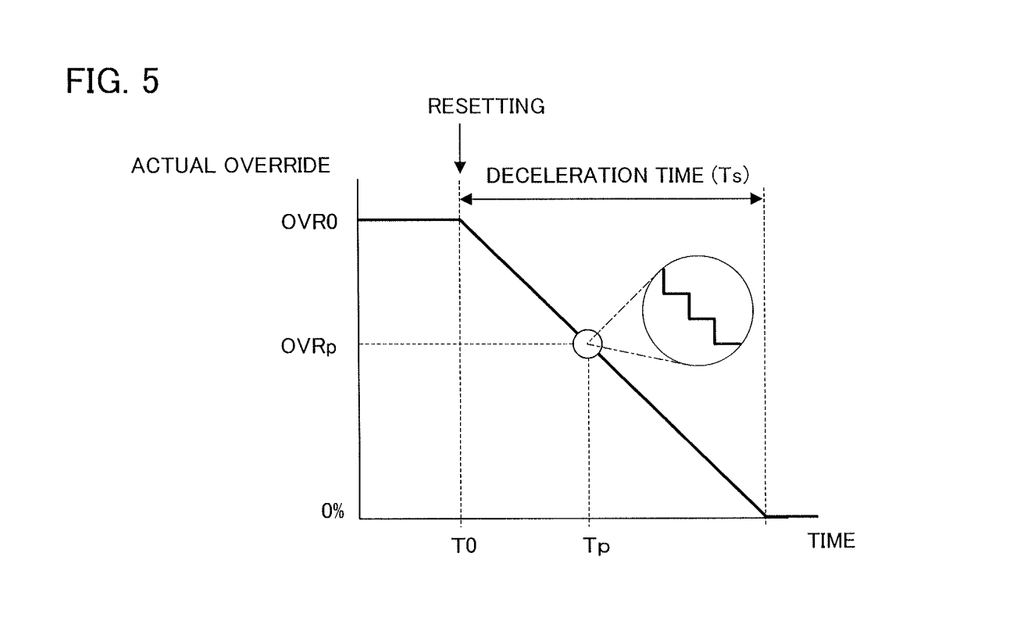
FIG. 5 is a diagram illustrating a calculation method of actual override at decelerating and stopping according to an embodiment of the present invention.

The decelerating and stopping override change unit 180 in the numerical control device 100 in the present embodiment, as shown in FIG. 5, changes the actual override from the actual override at start (OVR0) to 0% stepwisely at each interpolation period in deceleration time Ts predetermined by parameter, the machining program, or the like. Thus generation of the high-speed cycle machining data and the ladder program for decreasing the override little by little are not necessary.

The actual override OVRp at time Tp in interpolation period is represented by the equation (1), in time of the predetermined deceleration time Ts. Here, the minimum value of the OVRp is zero.

$$OVR_p = OVR_0 - \frac{T_p - T_0}{T_s}(OVR_0) \tag{1}$$

It should be noted that, in the restart of the operation after deceleration and stop by the feed holding or the interlocking, smooth acceleration is enabled by changing the actual override stepwisely at each interpolation cycle from 0% to the actual override at start (OVR0) in the deceleration time Ts.

The decelerating and stopping override change unit 180 in the numerical control device 100 in the present embodiment adjusts the start time of the deceleration such that the machine stops at the predetermined position in cycle operation, including the position at the time when operation of one period of cycle operation completes if necessary.

When the actual override is 100%, a set of the high-speed cycle machining data is executed in an execution period. When the actual override is 50%, a set of the high-speed cycle machining data is executed in two execution periods. Thus, number of the set of the execution data at each execution period can be calculated based on the actual override. For example, when the actual override is 50%, number of execution data for one execution period is 0.5.

The execution period of the high-speed cycle machining data can be changed by a parameter, and number of execution data (Dp) for an interpolation period (CYCp) is represented by Equation (2).

$$D_p = \frac{OVR_p}{100} \times \frac{CYC_p}{CYC_h} \tag{2}$$

Total sum of the number of the execution data (Dp) in the deceleration time Ts is equal to the number of decelerating and stopping data in the high-speed cycle machining data. Figure after the decimal point of the decelerating and stopping data of the high-speed cycle machining data is round up. When the actual override varies from 75% to, 50%, 25%, and 0% in each interpolation period (CYCp), the number of the execution data (Dp) varies from 0.75 to, 0.5, 0.25 and 0.0. The total sum of the number of execution data (Dp) is equal to 1.5, so the decelerating and stopping data number (Dn) is equal to 2.

Figure 6:
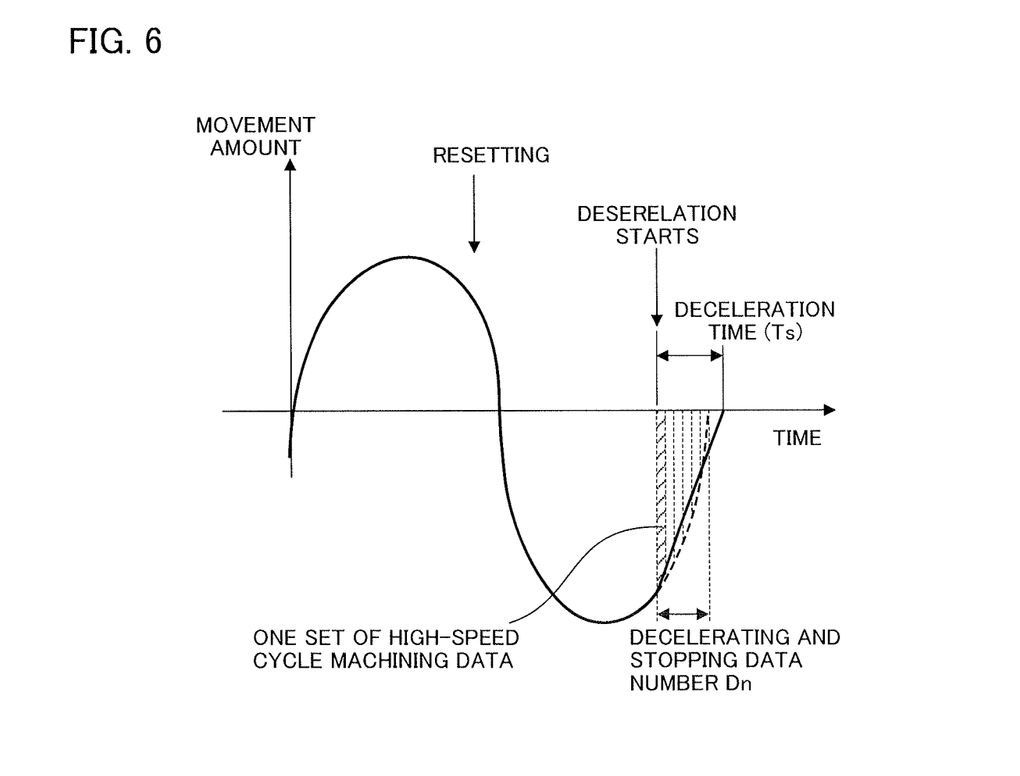
FIG. 6 is a graph illustrating a control method decelerating and stopping position according to an embodiment of the present invention.

The decelerating and stopping override change unit 180 in the present embodiment, as shown in FIG. 6, does not immediately start decelerating operation at time of resetting and starts decelerating when the residual data number of cycle operation is equal to the decelerating and stopping data number (Dn), such that the machine stops in the last movement amount data of the cycle operation.

Figure 7:
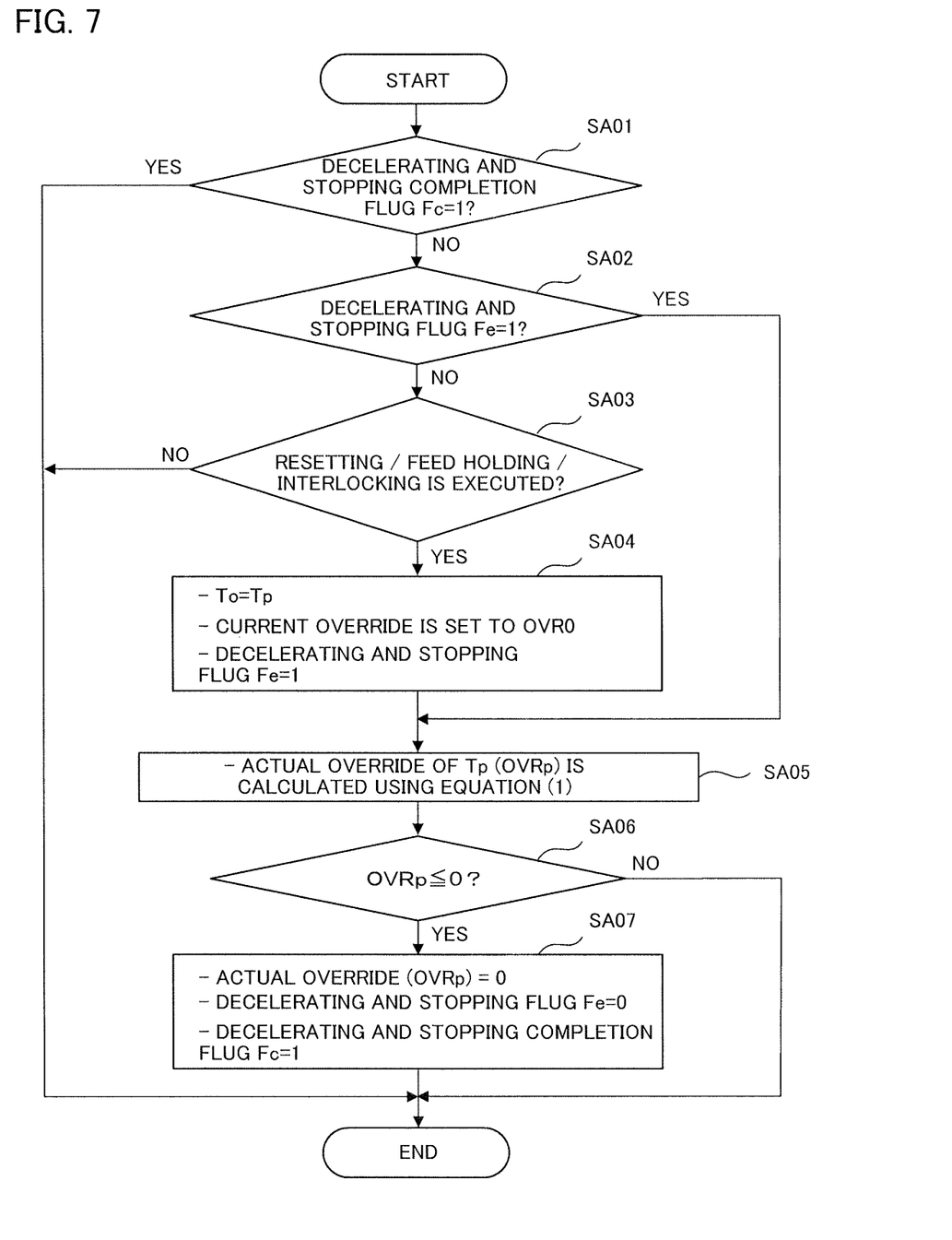
FIG. 7 is a flowchart of decelerating and stopping processing according to an embodiment of the present invention.

FIG. 7 is a flowchart of the decelerating and stopping override change unit 180 which changes the actual override to 0% stepwisely in predetermined time when any one of resetting, feed holding, and interlocking is executed during the high-speed cycle machining. This process is called by the feed rate calculation unit 120.

The process is executed under conditions below.

Condition 1: Decelerating and stopping completion flag is set as Fc. (Fc=0 at initial state and resetting state)

Condition 2: Decelerating and stopping flag is set as Fe. (Fe=0 at initial state and resetting state)

Condition 3: Time of the interpolation period when the process is called is set as Tp.

Condition 4: When any one of resetting, feed holding, and interlocking is executed at time T0, the actual override is stepwisely changed to 0% in the predetermined time.

[Step SA01] It is determined whether the decelerating and stopping completion flag Fc is set (to be 1) or not. The process in the current period ends when the decelerating and stopping completion flag Fc is set, while the process proceeds to Step SA02 when not.

[Step SA02] It is determined whether the decelerating and stopping flag Fe is set (to be 1) or not. The process proceeds to Step SA05 when the decelerating and stopping flag Fe is set, while the process proceeds to Step SA03 when not.

[Step SA03] It is determined whether operation of commanding resetting, feed holding, or interlocking is performed or not. If the operation is performed, the process proceeds to Step SA04, while the process in the current period ends it when the operation is not performed.

[Step SA04] Value of each variable for decelerating and stopping is initialized. The deceleration start time T0 is set to be time Tp in the interpolation period, and the current override is acquired from the override input unit 170 to be set as the actual override OVR0. In addition to that, the decelerating and stopping flag Fe is set.

[Step SA05] The actual override OVRp of Tp is calculated using Equation (1).

[Step SA06] It is determined whether OVRp is equal to or less than 0. The process proceeds to Step SA07 when OVRp is equal to or less than 0, while the process in the current period ends when not.

[Step SA07] Completion process of decelerating and stopping is performed. The actual override OVRp is set to 0, the decelerating and stopping flag Fe is reset, and the decelerating and stopping completion flag is set to end the process in the current period.

The embodiments of the present invention are described above. The present invention is not limited to the examples of the above embodiments, but is implemented in the other embodiments. For example, a position in cycle operation may be preset in the machining program or operation by the operator such that the machine stops at the preset position in the cycle operation, though the example in which the machine is adjusted to stop at the position at the time when operation of one period of cycle operation completes.

In addition to that, it is mentioned in the above embodiment that the value of the deceleration time Ts is preset, but the value may be set using not the deceleration time Ts but override change rate Rs at deceleration. In this case, since the deceleration time Ts is calculated by OVR0/Rs, using the override OVR0 at the time when the machining is interrupted and the preset override change rate Rs, the calculation may be executed based on Ts as the embodiment above.

The invention claimed is:

1. A numerical control device configured to perform stopping control of an axis of a machining tool to be controlled corresponding to command for machining interruption during high-speed cycle machining by moving a workpiece or a tool using cycle operation for repeatedly performing same motion,
wherein the numerical control device is further configured to analyze an NC program for machining based on an NC program command and to calculate a feed rate at each interpolation period obtained respectively by dividing each input period,
the numerical control device comprising:
an override input unit configured to acquire override to be input in the input period longer than the interpolation period;
a decelerating and stopping override change unit configured to calculate actual override, decelerated in stages at each interpolation period through dividing the override acquired by the override input unit in the input period by the interpolation period; and
a velocity calculation unit configured to perform decelerating and stopping control of the axis based on the actual override,
wherein said interpolation occurs during the high-speed cycle machining when any one of resetting, feed holding, and interlocking is performed; and
in restarting the operation after the deceleration and stop by performing any one of the resetting, the feed holding, and the interlocking, the actual override is changed in stages at each interpolation period of the cycle from 0% to the actual override at start.

2. The numerical control device according to claim 1, wherein the decelerating and stopping override change unit is configured to calculate the actual override such that the axis decelerates to stop at a predetermined position of the cycle operation.

* * * * *